(12) United States Patent
Harris

(10) Patent No.: US 8,678,053 B2
(45) Date of Patent: Mar. 25, 2014

(54) TOY WHEEL TRACTION BAND

(75) Inventor: Timothy Scot Harris, Fort Wayne, IN (US)

(73) Assignee: Peg Perego USA, Inc., Fort Wayne, IN (US)

( * ) Notice: Subject to any disclaimer, the term of this patent is extended or adjusted under 35 U.S.C. 154(b) by 679 days.

(21) Appl. No.: 12/860,215

(22) Filed: Aug. 20, 2010

(65) Prior Publication Data

US 2011/0048820 A1    Mar. 3, 2011

Related U.S. Application Data

(60) Provisional application No. 61/236,724, filed on Aug. 25, 2009.

(51) Int. Cl.
*A63G 25/00* (2006.01)
*B60C 11/02* (2006.01)

(52) U.S. Cl.
USPC ............. 152/209.5; 152/176; 152/209.6; 280/827; 301/5.302; 301/5.308

(58) Field of Classification Search
USPC ............... 152/209.5, 176, 209.6; 301/5.302, 301/5.308; 280/827
See application file for complete search history.

(56) References Cited

U.S. PATENT DOCUMENTS

| | | | |
|---|---|---|---|
| 2,953,181 A * | 9/1960 | Barassi | 152/176 |
| 2,996,098 A | 8/1961 | Lyon | |
| 3,559,710 A | 2/1971 | Deslauriers | |
| D232,110 S | 7/1974 | Krause | |
| D242,240 S | 11/1976 | Wellings | |
| 4,699,432 A * | 10/1987 | Klamer | 301/5.302 |
| D316,284 S | 4/1991 | Knudsen | |
| 5,316,377 A | 5/1994 | Markling et al. | |
| D355,464 S | 2/1995 | Wilson et al. | |
| 5,624,509 A | 4/1997 | Stanley | |
| D437,364 S | 2/2001 | Jang | |
| 6,286,573 B1 * | 9/2001 | Hine | 152/209.5 |

(Continued)

FOREIGN PATENT DOCUMENTS

| | | | |
|---|---|---|---|
| DE | 1031192 A * | 5/1958 | |
| DE | 29917340 U1 * | 2/2000 | |

OTHER PUBLICATIONS

Machine translation for German 1,031,192 (no date).*
Machine translation for German 29917340 (no date).*

*Primary Examiner* — Steven D Maki
(74) *Attorney, Agent, or Firm* — Barnes & Thornburg LLP

(57) ABSTRACT

A child's riding toy is provided having a vehicle body, at least one rotatable tire, and traction band. The at least one rotatable tire is configured to support at least a portion of the vehicle body and move the vehicle body from one location to another. The rotatable tire comprises a circumferentially-extending tread section, a sidewall, and a circumferentially-extending shoulder connecting to both the tread section and sidewall. The circumferentially-extending tread section comprises a tread surface configured to engage a ground surface while supporting at least the portion of the vehicle body. The tread section includes a channel equatorially located and circumferentially-extending. The traction band is sized to fit within the channel and have a top surface located about flush with the tread surface such that as the tread surface engages the ground surface so too does the band's top surface. Wherein both the traction band and tire tread simultaneously engage the ground to move the ride-on toy.

3 Claims, 5 Drawing Sheets

(56) References Cited

U.S. PATENT DOCUMENTS

| | | |
|---|---|---|
| 7,032,980 B2* | 4/2006 | Herbert et al. ............. 301/5.308 |
| 7,481,498 B1 | 1/2009 | Morris |
| 2002/0105182 A1* | 8/2002 | Huntsberger et al. ......... 280/827 |
| 2006/0005905 A1* | 1/2006 | Croissant et al. ........ 152/209.18 |
| 2007/0068613 A1* | 3/2007 | Byrne et al. ............... 152/209.1 |
| 2007/0128976 A1 | 6/2007 | Accerenzi |
| 2008/0121452 A1* | 5/2008 | Bon .............................. 180/205 |
| 2008/0190530 A1 | 8/2008 | Shih |

\* cited by examiner

TOY WHEEL TRACTION BAND

RELATED APPLICATIONS

The present application is related to and claims priority to U.S. Provisional Patent Application, Ser. No. 61/236,724, filed on Aug. 25, 2009, entitled "Toy Wheel Traction Band." To the extent not included below, the subject matter disclosed in those applications is hereby expressly incorporated herein by reference.

TECHNICAL FIELD AND SUMMARY

The present disclosure is related to battery-powered ride on toys for children.

Motorized toy vehicles are typically small, battery-powered replicas of larger vehicles such as cars, trucks, and even all terrain vehicles (ATVs). These toy vehicles ride on plastic tires or wheels that simulate the look of real vehicle tires. For purposes of this application, references to tire and wheel are meant to be synonymous. In contrast to real rubber tires, however, these wheels are blow-molded into shape and made from high density polyethylene (HDPE). Although this is a typical method of constructing a toy vehicle wheel, there have been problems. The conventional HDPE wheels offer sufficient traction at low speed using low power, but tend to slip more at higher speed and higher power. With 24 volt-powered vehicles, HDPE wheels slip.

Conventional solutions, however, are not sufficient. For example, adding traction bands made from various forms of rubber or polyvinyl chloride (PVC) provide plenty of traction. These bands wrap around the circumference of the wheel and extend outward from the tread surface. As a result, the weight of the vehicle and rider(s) are supported by the traction band. None of the plastic wheel contacts the ground surface. A similar solution was to simply cover the entire HDPE tire with a rubber or PVC band so none of the original HDPE tread surface was exposed. These bands produced substantial traction, but it was determined to be too much traction. Indeed too much traction in certain circumstances may be as detrimental as too little traction. For example, the high torque at the startup of a 24 volt motor causing stress on the gear boxes, and high current through the DC motor creating heat. As a result, these components needed to be made much stronger which translated into higher costs. Other solutions were considered as well, such as changing the composition of the plastic material that formed the blow-molded wheel, but these produced too little traction.

It was unexpectedly determined that employing a traction band fitted inside an HDPE wheel could respond to the increased power without excessive slipping, while at the same time not creating so much friction as to over-stress the gear boxes, motors, and other components. In contrast to prior thinking and design, both the traction band and the HDPE tire tread now contact the ground surface concurrently as a result of the weight of the vehicle and its rider(s). In other words, the weight provides enough compressive force on the wheels so both materials make contact with the ground surface. The different friction surfaces on the wheel appear to create a balance that better handles the additional power of the vehicle. It was subsequently learned that the ratio of HDPE tire tread to traction band surface can be adjusted to change the amount of traction.

In an illustrative embodiment, the present disclosure includes a battery-operated child's ride-on toy with a tire or wheel that comprises a channel illustratively located about on the centerline of the tread surface. A rubber, such as nitrile rubber, forms a circular traction band that fits into the channel so the traction band's top surface is about level with the plastic tread surface. When force from the weight of the child and the vehicle exerts on the wheels, it causes both the rubber surface of the traction band and the tread surface of the plastic wheel to engage the ground surface.

Another illustrative embodiment provides child's riding toy. The riding toy comprises a vehicle body, at least one rotatable tire, and traction band. The vehicle body includes the at least one rotatable tire and at least one seating surface. The at least one rotatable tire is configured to support at least a portion of the vehicle body and move the vehicle body from one location to another. The seating surface is configured to support a person of juvenile age, wherein that person is able to operate the vehicle body while seated on the seating surface. The rotatable tire comprises a circumferentially-extending tread section, a sidewall, and a circumferentially-extending shoulder connecting to both the tread section and sidewall. The circumferentially-extending tread section comprises a tread surface configured to engage a ground surface while supporting at least the portion of the vehicle body. The tread section includes a channel equatorially located and circumferentially-extending. The traction band is sized to fit within the channel and have a top surface located about flush with the tread surface such that as the tread surface engages the ground surface so too does the band's top surface. The tread surface of the tire is made of a first material and the top surface of the traction band is made of a second material.

In the above and other embodiments, the child's riding toy may further comprise: the first material having a different coefficient of friction than the second material; the tire being configured such that when it contacts the ground surface both the first and second materials with their different coefficient's of friction engage the ground surface; the first material being a plastic and the second material being a rubber; the riding toy being battery-operated; the second material being a nitrile rubber; and the first material being a high density polyethylene.

Additional features and advantages of the child's ride-on toy will become apparent to those skilled in the art upon consideration of the detailed descriptions exemplifying the best mode of carrying out the child's ride-on toy as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the child's ride-on toy, and such exemplification is not to be construed as limiting the scope of the child's ride-on toy in any manner.

DETAILED DESCRIPTION OF THE DRAWINGS

Figure 1:
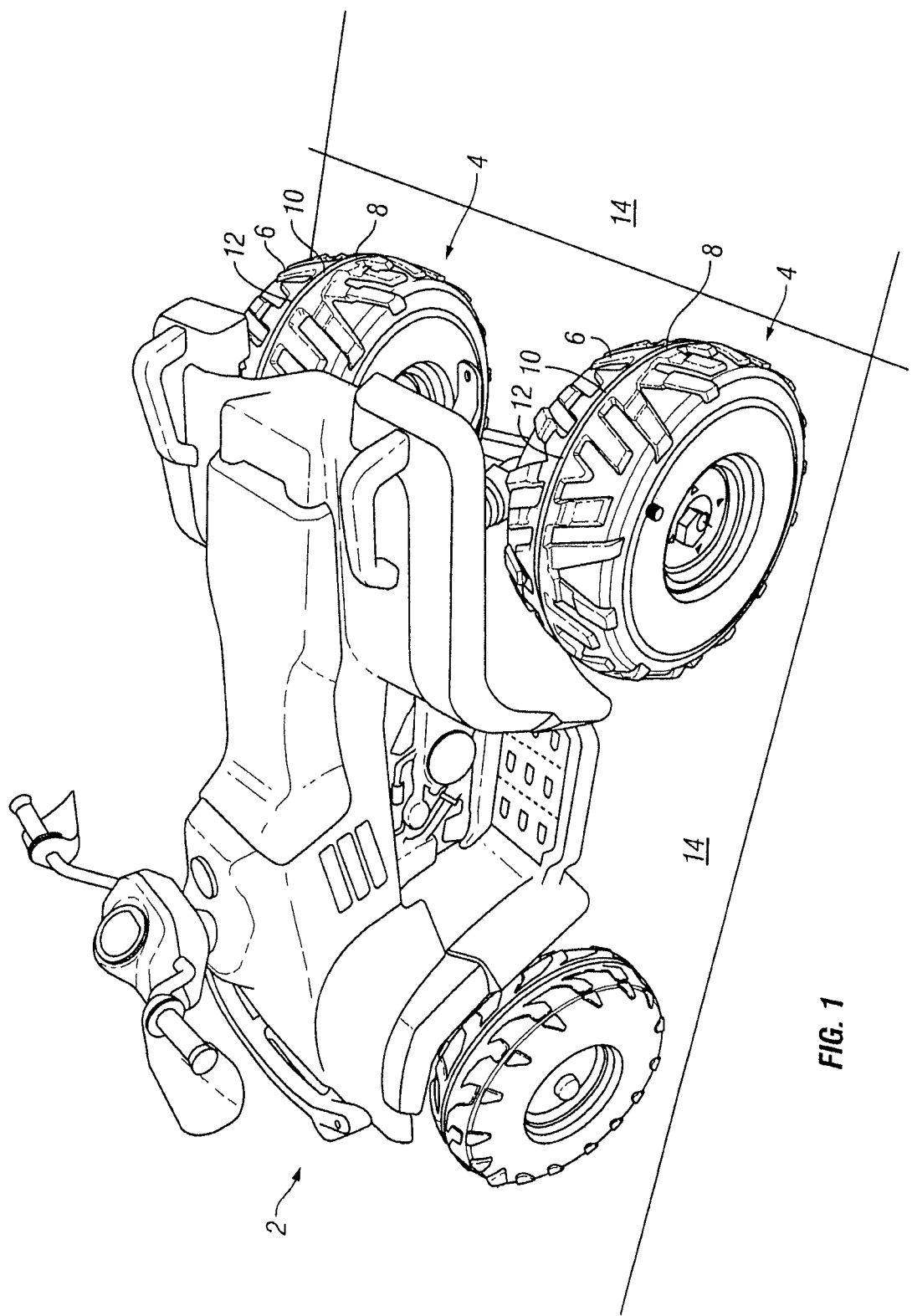
FIG. 1 is a perspective view of a child's ride-on toy.

A perspective view of a child's ride-on toy 2 is shown in FIG. 1. This view is illustrative of the type of riding toy useful for the wheels described herein. It is appreciated that riding toys of a variety of configurations may benefit from this wheel including simulated trucks, jeeps, motorcycles, etc. As shown, this toy is movable using a battery-operated DC motor that rotates the rear wheels. When an accelerator (not shown) is depressed, the motor activates rotating gears (not shown) that rotates rear wheels 4. Illustratively, wheels 4 are made from HDPE or similar plastic. Treads 6 are located on the outer circumference of each wheel 4. A channel 10 in each wheel 4 receives rubber traction band 8 so top surface 12 engages ground surface 14.

The rubber of the traction band has a higher coefficient of friction than the HDPE or plastic. This dual engagement surface balances the overall coefficient of friction, as determined through observation. The result is less spinning on ground surface 14 to begin moving the vehicle 2.

Figure 2:
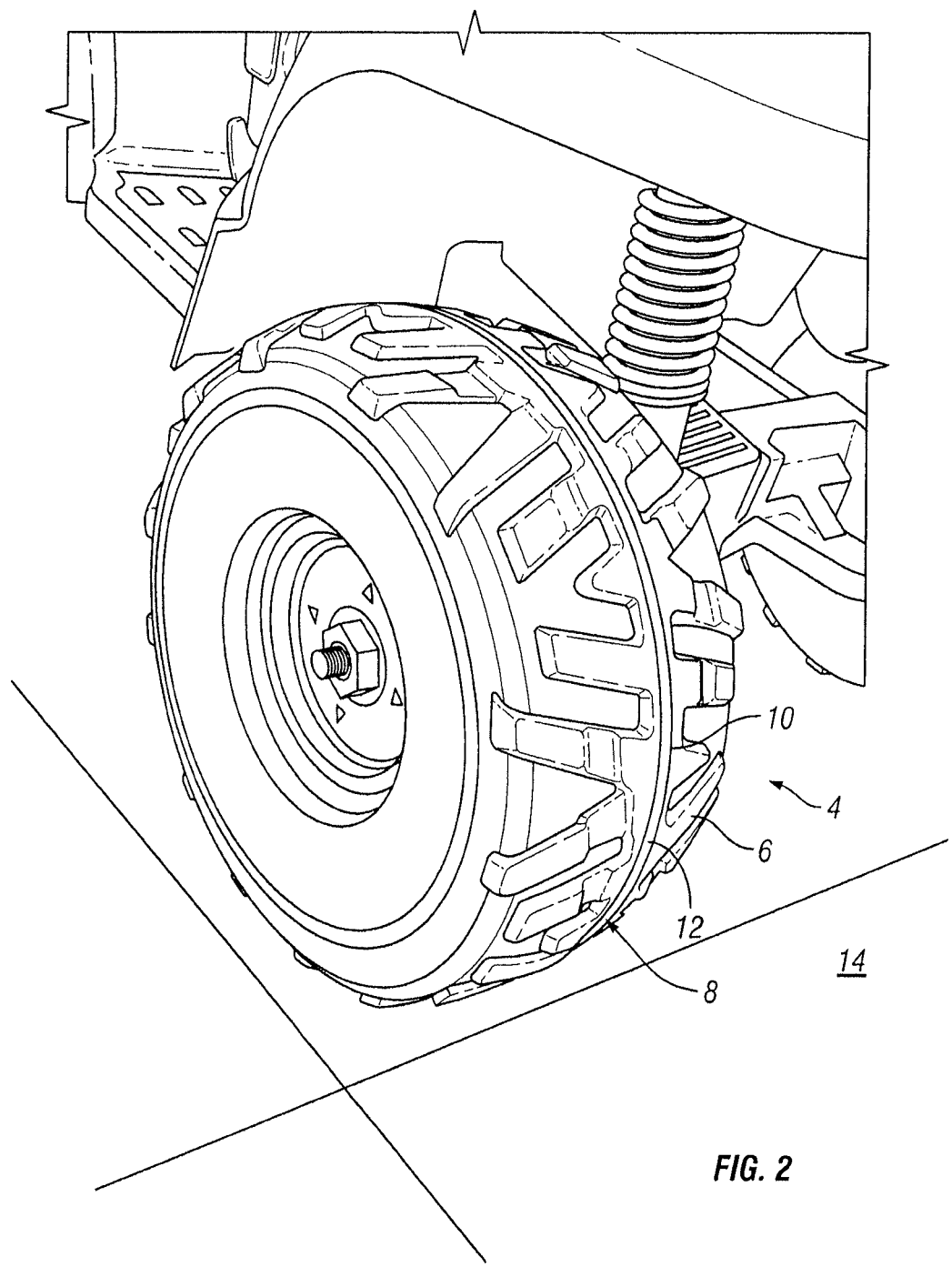
FIG. 2 is a perspective view of a wheel with treaded surface and traction band positioned in a channel in the wheel.

A perspective view of wheel 4 with treaded surface 6 and traction band 8 positioned in channel 10 is shown in FIG. 2. This view shows how the top surface 12 of band 8 is about level with tread surface 6. This way both surfaces 6 and 12 will contact ground surface 14. In this illustrative embodiment, the width of traction band 6 is about ¼ inch. It is appreciated, however, that the width of traction band 6 can vary depending on the traction requirements. A wider traction band means more traction, less width means less traction.

Figure 3:
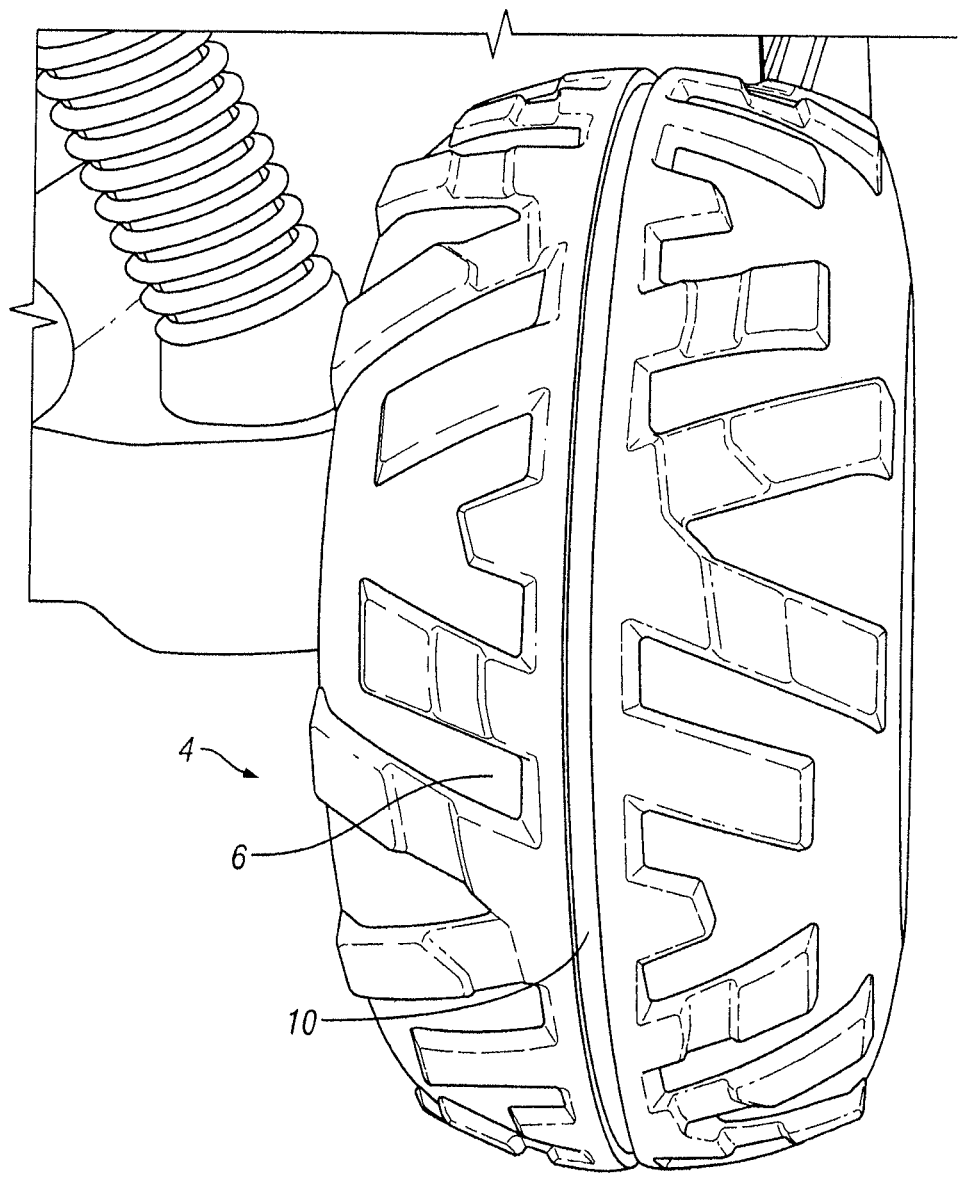
FIG. 3 is an end view of the wheel.

An end view of wheel 4 is shown in FIG. 3. This view shows channel 10 bounded by tread surface 6. Channel 10 illustratively equatorially extends around tread surface 6 creating hemispheres of tread surfaces. It is appreciated that channel 10 may be positioned in other locations on treat surface 6 depending on the design of the wheel and desired friction characteristics. Channels can be formed in either tread hemisphere to receive a traction band so long as the band or bands engage the ground surface with the plastic wheel.

Figure 4:
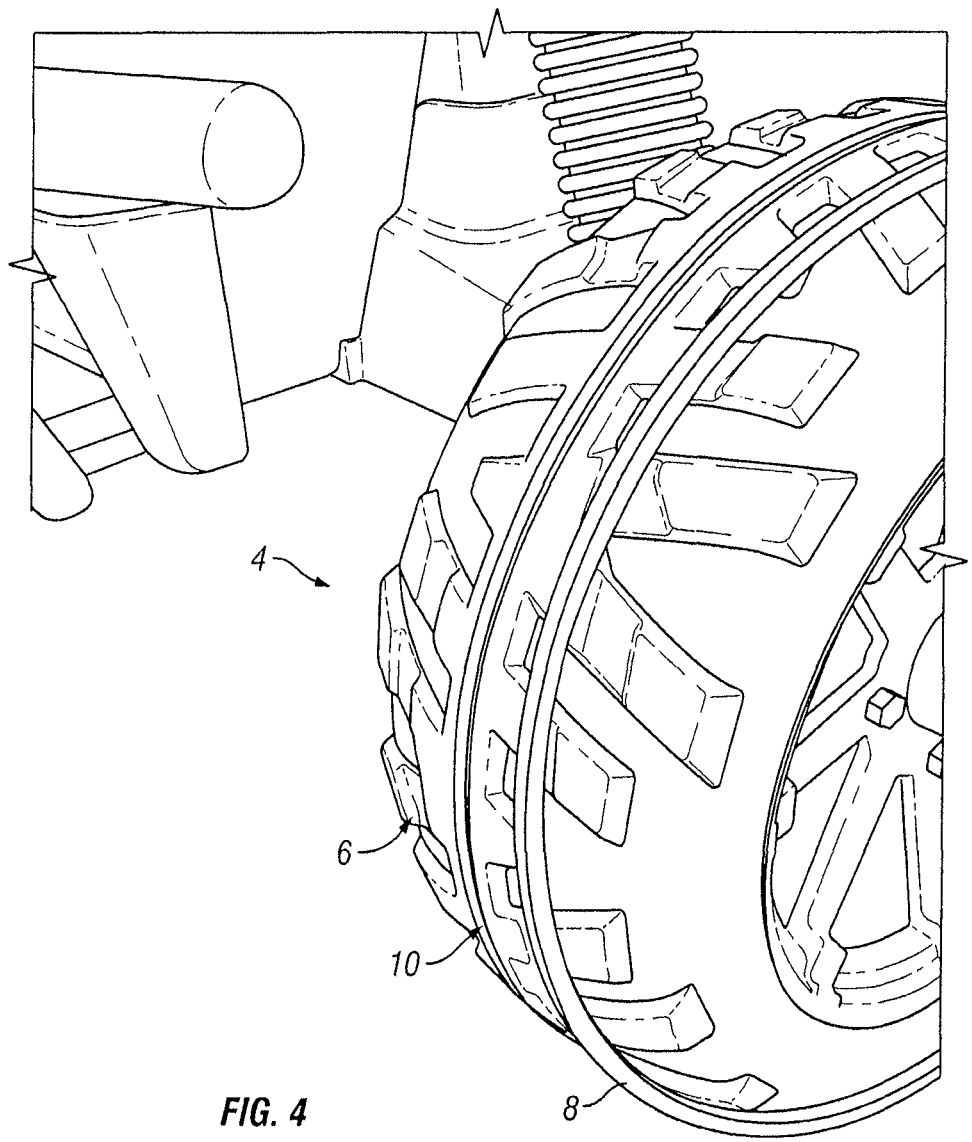
FIG. 4 is another perspective view of the wheel but with the traction band removed from the channel.

Another perspective view of wheel 4, but with traction band 8 removed from channel 10, is shown in FIG. 4. As shown, traction band 8 illustratively has a generally square cross section and is made of nitrile rubber. Assembling wheel 4 illustratively comprises stretching traction band over the periphery of tread surface 6. Band 8 is pushed over treads 6 until it seats in channel 10.

Figure 5:
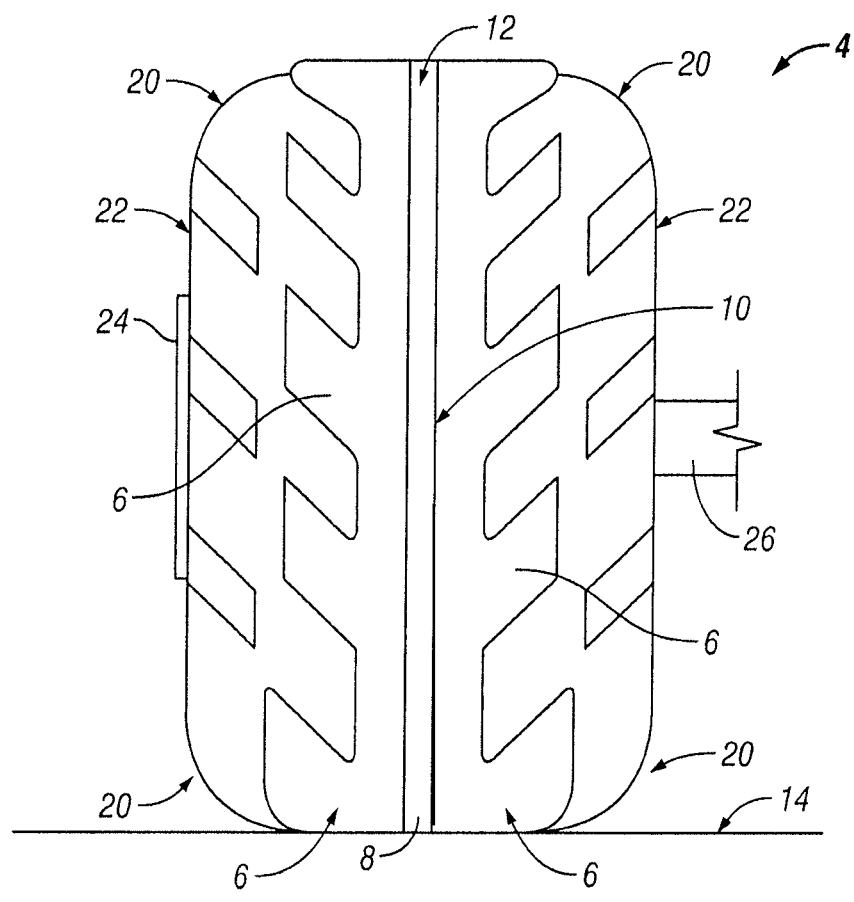
FIG. 5 is an end view of the wheel with the treads and band engaged with the ground surface.

An end view of wheel 4 is shown in FIG. 5. This view shows circumferentially extending tread 6 disposed around wheel 4 and illustratively bisected by band 8. Shoulder 20 connects this section with sidewall 22. This view shows how both treads 6 and band 8 simultaneously engage ground surface 14. The combination of the band and wheel create the optimum traction from moving the toy vehicle. This view also shows rim 24 and axle 26.

Additional features and advantages of the battery-operated child's ride-on toy will become apparent to those skilled in the art upon consideration of the detailed descriptions exemplifying the best mode of carrying out the battery-operated child's ride-on toy as presently perceived.

What is claimed is:

1. A child's riding toy comprising:
a vehicle body that includes at least one rotatable tire and at least one seating surface, wherein the at least one rotatable tire is configured to support at least a portion of the vehicle body and move the vehicle body from one location to another, wherein the seating surface is configured to support a person of juvenile age, wherein the person of juvenile age is able to operate the vehicle body while seated on the seating surface;
wherein the rotatable tire comprises a circumferentially-extending tread section, a sidewall, and a circumferentially-extending shoulder connecting to both the tread section and sidewall;
wherein the rotatable tire is made of blow-molded high density polyethylene;
wherein the tread section of the rotatable tire includes treads that are raised portions of the tread section;
wherein the circumferentially-extending tread section comprises a tread surface configured to engage a ground surface while supporting at least the portion of the vehicle body, wherein the tread section includes a channel equatorially located and circumferentially-extending;
the channel includes a floor and upwardly-extending sidewall;
a traction band sized to fit within the channel and having a top surface located about flush with the tread surface such that as the tread surface engages the ground surface so too does the band's top surface;
wherein the traction band is made of rubber;
wherein the traction band is selectively removable from the channel and wherein the traction band fills the channel;
wherein the rotatable tire is sized such that the traction band is stretchable over the rotatable tire and fits in the channel;
wherein the high density polyethylene has a different coefficient of friction than the rubber and is configured such that when the tire contacts the ground surface both the high density polyethylene and the rubber with their different coefficient's of friction engage the ground surface; and
wherein the tread surface has a coefficient of friction that does not over-stress a gear box or motor of the child's ride-on toy.

2. The child's riding toy of claim 1, wherein the riding toy is battery-operated.

3. The child's riding toy of claim 1, wherein the rubber is a nitrile rubber.

* * * * *